(12) United States Patent
Kalavrouziotis et al.

(10) Patent No.: US 11,789,203 B2
(45) Date of Patent: Oct. 17, 2023

(54) COUPLING ELEMENT WITH EMBEDDED MODAL FILTERING FOR A LASER AND/OR PHOTODIODE

(71) Applicant: Mellanox Technologies, Ltd., Yokneam (IL)

(72) Inventors: Dimitrios Kalavrouziotis, Papagou (GR); Yaakov Gridish, Yoqneam Ilit (IL); Paraskevas Bakopoulos, Ilion (GR); Anders Gösta Larsson, Hovås (SE); Elad Mentovich, Tel Aviv (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 17/362,405

(22) Filed: Jun. 29, 2021

(65) Prior Publication Data
US 2022/0390673 A1 Dec. 8, 2022

(30) Foreign Application Priority Data
Jun. 7, 2021 (GR) .............................. 20210100371

(51) Int. Cl.
*G02B 6/26* (2006.01)
*G02B 6/42* (2006.01)
(Continued)

(52) U.S. Cl.
CPC ............ *G02B 6/268* (2013.01); *G02B 6/262* (2013.01); *G02B 6/421* (2013.01); *G02B 6/1228* (2013.01); *G02B 6/14* (2013.01); *H01S 3/06745* (2013.01)

(58) Field of Classification Search
CPC ................................ G02B 6/268; G02B 6/421
See application file for complete search history.

(56) References Cited

U.S. PATENT DOCUMENTS 5,712,937 A * 1/1998 Asawa ............... G02B 6/12007
385/12
6,044,188 A * 3/2000 Kropp .................... G02B 6/421
385/35
(Continued)

FOREIGN PATENT DOCUMENTS

DE           3617799 A1 * 12/1987
KR   10-2005-0092286 A  *  9/2005
WO    WO 2014/086393 A1 *  6/2014

OTHER PUBLICATIONS

S. Moon et al. Effective single-mode transmission at wavelengths shorter than the cutoff wavelength of an optical fiber. IEEE Photonics Technology Letters, 17:12:2604-2606, Dec. 2005. (Year: 2005).*

(Continued)

*Primary Examiner* — Michael Stahl
(74) *Attorney, Agent, or Firm* — Moore & Van Allen PLLC; Michael Madison McCraw

(57) ABSTRACT

Embodiments are disclosed for a coupling element with embedded modal filtering for a laser and/or a photodiode. An example system includes a laser and an optical coupling element. The laser is configured to emit an optical signal. The optical coupling element is configured to receive the optical signal emitted by the laser. The optical coupling element is also configured to be connected to an optical fiber such that, in operation, the optical signal is transmitted from the laser to the optical fiber via the optical coupling element. Furthermore, the coupling element comprises a tapered section that provides modal filtering of the optical signal.

21 Claims, 11 Drawing Sheets

(51) Int. Cl.
G02B 6/14 (2006.01)
G02B 6/122 (2006.01)
H01S 3/067 (2006.01)

(56) References Cited

U.S. PATENT DOCUMENTS

| | | | | |
|---|---|---|---|---|
| 6,185,346 | B1* | 2/2001 | Asawa | G02B 6/14 385/28 |
| 7,215,846 | B1* | 5/2007 | Deliwala | G02B 6/1228 385/44 |
| 7,283,701 | B2* | 10/2007 | Hallemeier | G02B 6/14 385/27 |
| 2002/0031304 | A1* | 3/2002 | Roberts | G02B 6/1228 385/28 |
| 2007/0081764 | A1* | 4/2007 | Deliwala | G02B 6/14 385/29 |
| 2009/0136176 | A1* | 5/2009 | Kopp | G02B 6/264 264/1.25 |
| 2014/0037244 | A1* | 2/2014 | Sorin | G02B 6/264 385/28 |
| 2017/0176697 | A1* | 6/2017 | Polleux | G03F 7/2002 |
| 2019/0049675 | A1* | 2/2019 | Szostkiewicz | G02B 6/1228 |
| 2019/0115722 | A1* | 4/2019 | Sorin | H01S 5/1833 |
| 2021/0373256 | A1* | 12/2021 | Hayamizu | H01S 5/02438 |

OTHER PUBLICATIONS

R. Koyama et al. A novel mode converter using tapered fiber for dual mode transmission. 2007 IEEE Lasers and Electro-Optics Society Annual Meeting Conference Proceedings, pp. 317-318, Oct. 2007. (Year: 2007).*

S. Moon et al. Spliced-fiber mode filter for 1060-nm single mode transmission. Optics Communications, 283:3957-3961, Oct. 2010. (Year: 2010).*

D. Đonlagić. In-line higher order mode filters based on long highly uniform fiber tapers. Journal of Lightwave Technology, 24:9:3532-3539, Sep. 2006. (Year: 2006).*

Z. Haas et al. A mode-filtering scheme for improvement of the bandwidth-distance product in multimode fiber systems. Journal of Lightwave Technology, 11:7:1125-1131, Jul. 1993. (Year: 1993).*

P. Schnitzer et al. Biased and bias-free multi-GB/s data links using GaAs VCSEL's and 1300-nm single-mode fiber. IEEE Photonics Technology Letters, 10:12:1781-1783, Dec. 1998. (Year: 1998).*

D. Vez et al. 850 nm vertical-cavity laser pigtailed to standard singlemode fibre for radio over fibre transmission. Electronics Letters, 40:19, Sep. 2004. (Year: 2004).*

Y. Jung et al. Broadband single-mode operation of standard optical fibers by using a sub-wavelength optical wire filter. Optics Express, 16:19:14661-14667, Sep. 15, 2008. (Year: 2008).*

Tan, Michael R.T., et al.; "50 GB/s PAM4 Modulated 1065 nm Single-Mode VCSELs Using SMF-28 for Mega-Data Centers"; IEEE Photonics Technology Letters, vol. 29, No. 13, Jul. 1, 2017, pp. 1128-1131.

Optoscribe, Pioneering 3D Photonoic Integrated Circuits; Downloaded on Sep. 22, 2021, via the Internet at: https://www.optoscribe.com/technology/technology-overview/, 10 pages.

Teem Phonotics; WAFT Interposers—Waveguide Array to Fiber Transposers; Downloaded on Sep. 22, 2021, via the Internet at: https://www.teemphotonics.com/integrated-photonics/waft-pic-packaging/; 5 pages.

* cited by examiner

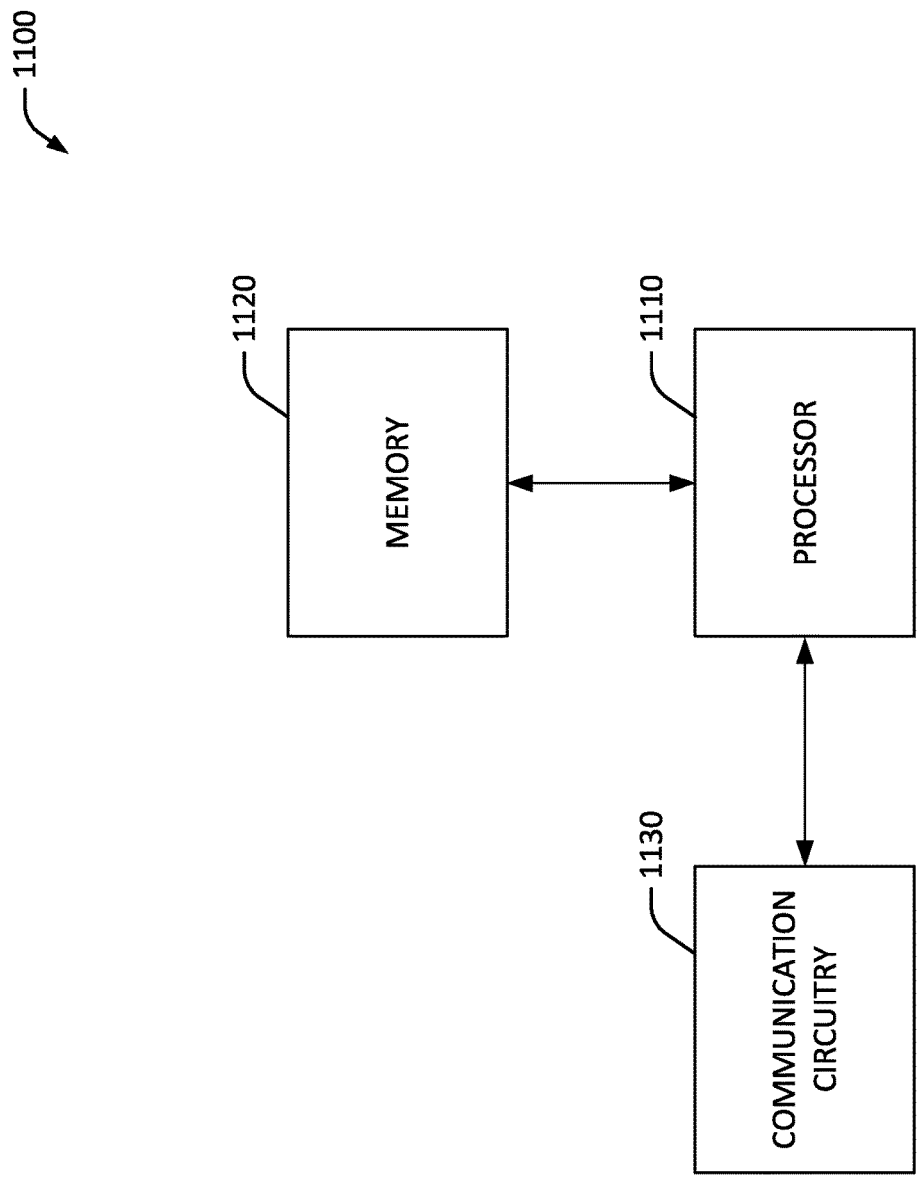

COUPLING ELEMENT WITH EMBEDDED MODAL FILTERING FOR A LASER AND/OR PHOTODIODE

CROSS-REFERENCE TO RELATED APPLICATIONS

This application claims priority to Greek application number 20210100371, filed Jun. 7, 2021, which is hereby incorporated herein by reference in its entirety.

TECHNOLOGICAL FIELD

Embodiments of the present invention relate generally to an optical coupling element for optical transceivers and/or active optical cables.

BACKGROUND

A laser is often employed in optical interconnects (e.g., data center optical interconnects) to provide an output laser beam for fiber optic communications. However, misalignment of the output laser beam with respect to a fiber optic cable may occur at a laser coupler interface or at another fiber connector along a fiber optic link, resulting in power leakage and/or signal distortion with respect to the fiber optic cable.

BRIEF SUMMARY

Example embodiments of the present invention relate generally to a system(s), method and apparatus to provide a coupling element with embedded modal filtering for a laser and/or photodiode. The details of some embodiments of the subject matter described in this specification are set forth in the accompanying drawings and the description below. Other features, aspects, and advantages of the subject matter will become apparent from the description, the drawings, and the claims.

In an embodiment, a system comprises a laser and an optical coupling element. The laser is configured to emit an optical signal. The optical coupling element is configured to receive the optical signal emitted by the laser. In this embodiment, the optical coupling element is configured to be connected to an optical fiber such that, in operation, the optical signal is transmitted from the laser to the optical fiber via the optical coupling element. Furthermore, in this embodiment, the coupling element comprises a tapered section that provides modal filtering of the optical signal.

In some embodiments, the tapered section comprises at least one tapered optical fiber section associated with the modal filtering.

In some embodiments, the tapered section comprises a tapered optical fiber core.

In some embodiments, the tapered section comprises at least one tapered waveguide section associated with the modal filtering.

In some embodiments, the tapered section comprises a first optical fiber section associated with a first core diameter, a second optical fiber section associated with a second core diameter, and a third optical fiber section associated with the first core diameter.

In some embodiments, the tapered section comprises a first optical fiber section associated with a first optical fiber shape, a second optical fiber section associated with a second optical fiber shape, and a third optical fiber section associated with the first optical fiber shape.

In some embodiments, the tapered section comprises a first waveguide section associated with a first waveguide size, a second waveguide section associated with a second waveguide size, and a third waveguide section associated with the first waveguide size.

In some embodiments, the tapered section comprises a first waveguide section associated with a first waveguide shape, a second waveguide section associated with a second waveguide shape, and a third waveguide section associated with the first waveguide shape.

In some embodiments, the optical coupling element is attached to a mechanical structure via an adhesive material, and wherein the adhesive material has a refractive index configured for the modal filtering.

In some embodiments, a mirror is disposed between the laser and the optical coupling element. Furthermore, in some embodiments, the mirror directs the optical signal from the laser to the optical coupling element.

In some embodiments, the laser is an optical transceiver laser.

In another embodiment, a system comprises a photodiode and an optical coupling element. The photodiode is configured to receive an optical signal transmitted via an optical fiber. The optical coupling element is configured to be connected to the optical fiber such that, in operation, the optical signal is transmitted from the optical fiber to the photodiode via the optical coupling element. In this embodiment, the coupling element comprises a tapered section that provides modal filtering of the optical signal.

In some embodiments, the tapered section comprises at least one tapered optical fiber section associated with the modal filtering.

In some embodiments, the tapered section comprises a tapered optical fiber core.

In some embodiments, the tapered section comprises at least one tapered waveguide section associated with the modal filtering.

In some embodiments, the tapered section comprises a first optical fiber section associated with a first core diameter, a second optical fiber section associated with a second core diameter, and a third optical fiber section associated with the first core diameter.

In some embodiments, the tapered section comprises a first optical fiber section associated with a first optical fiber shape, a second optical fiber section associated with a second optical fiber shape, and a third optical fiber section associated with the first optical fiber shape.

In some embodiments, the tapered section comprises a first waveguide section associated with a first waveguide size, a second waveguide section associated with a second waveguide size, and a third waveguide section associated with the first waveguide size.

In some embodiments, the tapered section comprises a first waveguide section associated with a first waveguide shape, a second waveguide section associated with a second waveguide shape, and a third waveguide section associated with the first waveguide shape.

In another embodiment, a system comprises a laser and an optical coupling element. The laser is configured to emit an optical signal. The optical coupling element is configured to receive the optical signal emitted by the laser. In this embodiment, the optical coupling element is configured to be connected to an optical fiber such that, in operation, the optical signal is transmitted from the laser to the optical fiber via the optical coupling element. Furthermore, in this embodiment, the coupling element interfaces a first optical fiber section associated with a first core diameter and a second optical fiber section associated with a second core diameter. In this embodiment, the coupling element also provides modal filtering of the optical signal.

In some embodiments, the coupling element interfaces the first optical fiber section and the second optical fiber section via a tapered section to provide the modal filtering of the optical signal. In some embodiments, the coupling element interfaces the first optical fiber section and the second optical fiber section via fusion-splicing to provide the modal filtering of the optical signal.

In yet another embodiment, a method is provided. The method provides for receiving an electrical signal associated with communication data. The method also provides for configuring, based on the electrical signal, emission of an optical signal by a laser that is optically coupled to an optical coupling element that comprises a tapered section for providing modal filtering of the optical signal.

In yet another embodiment, a method is provided. The method provides for receiving an optical signal associated with communication data via a photodiode optically coupled to an optical coupling element that comprises a tapered section for providing modal filtering of the optical signal. The method also provides for translating the optical signal into an electrical signal.

The above summary is provided merely for purposes of summarizing some example embodiments to provide a basic understanding of some aspects of the present invention. Accordingly, it will be appreciated that the above-described embodiments are merely examples and should not be construed to narrow the scope or spirit of the present invention in any way. It will be appreciated that the scope of the present invention encompasses many potential embodiments in addition to those here summarized, some of which will be further described below.

BRIEF DESCRIPTION OF THE DRAWINGS

Figure 1:
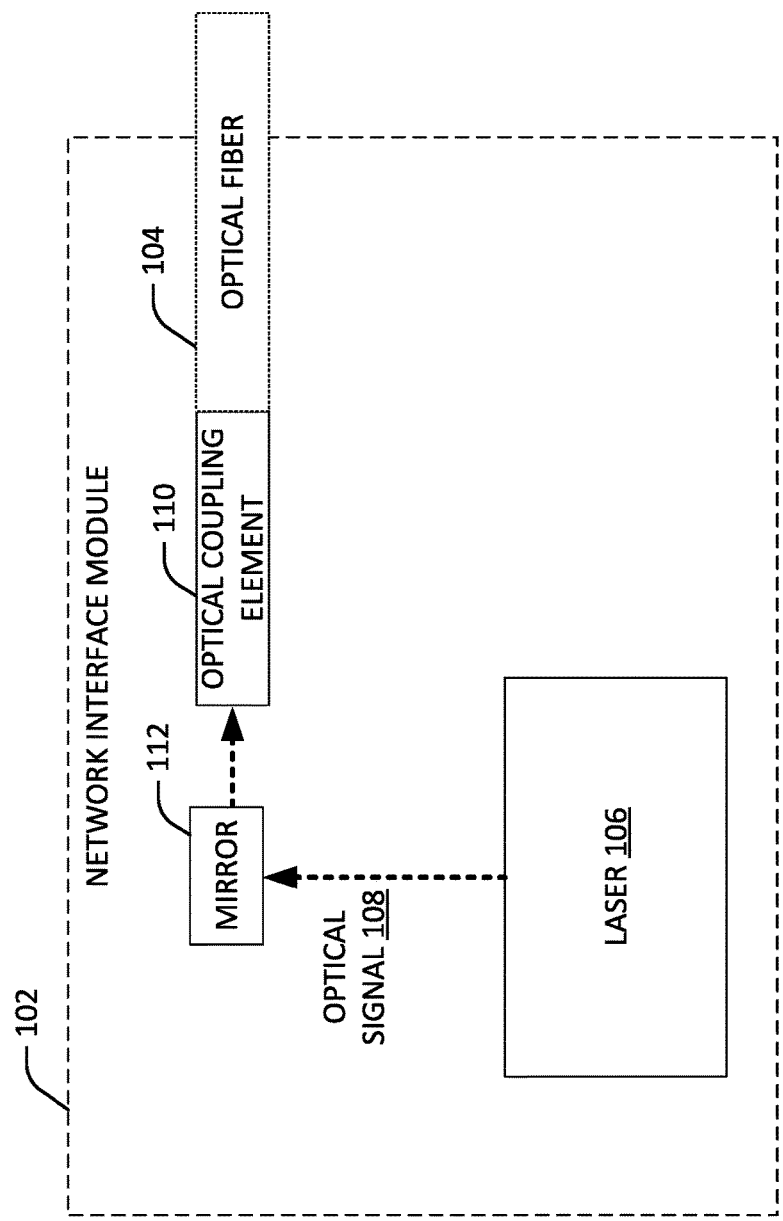
Figure 2:
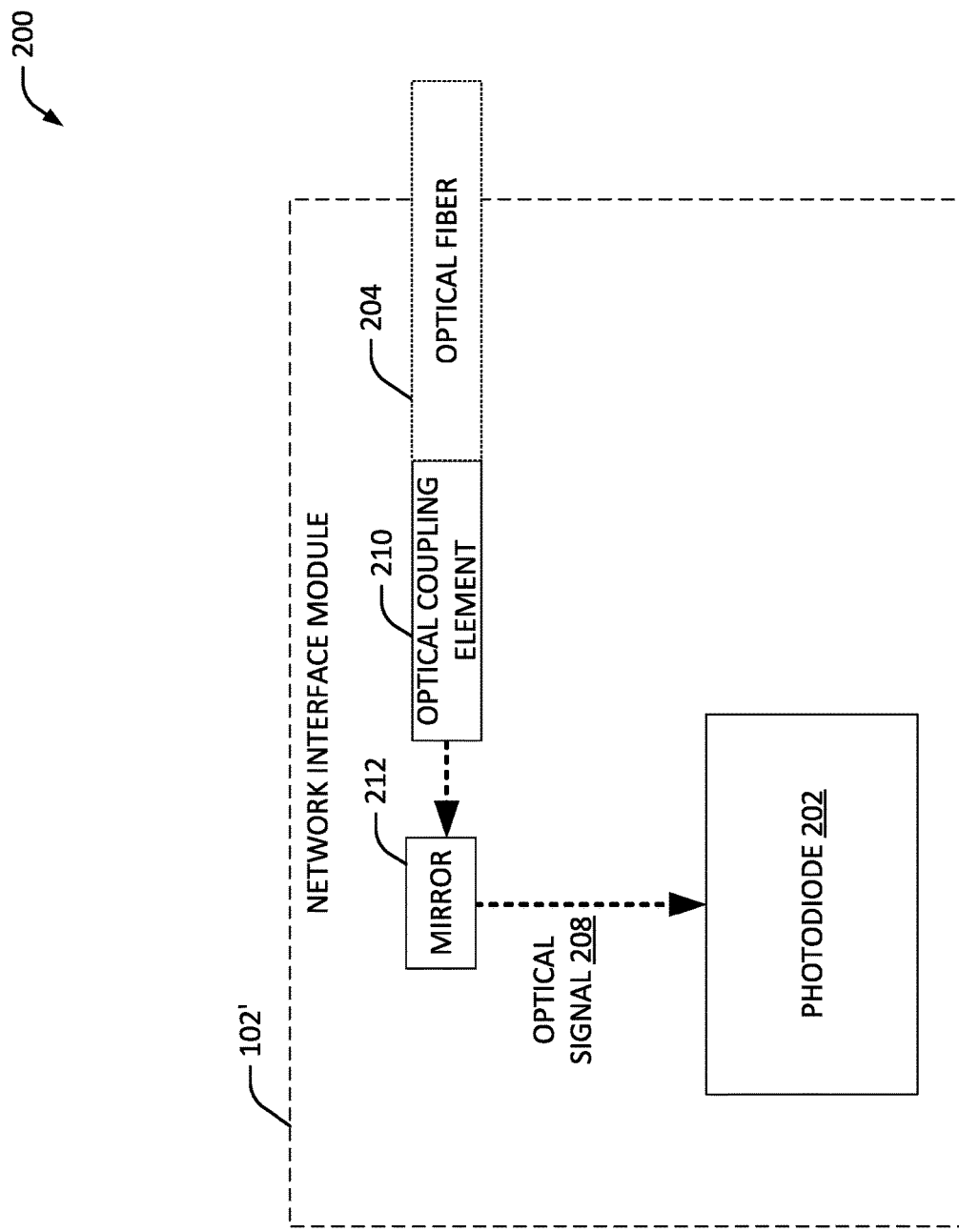
Figure 3:
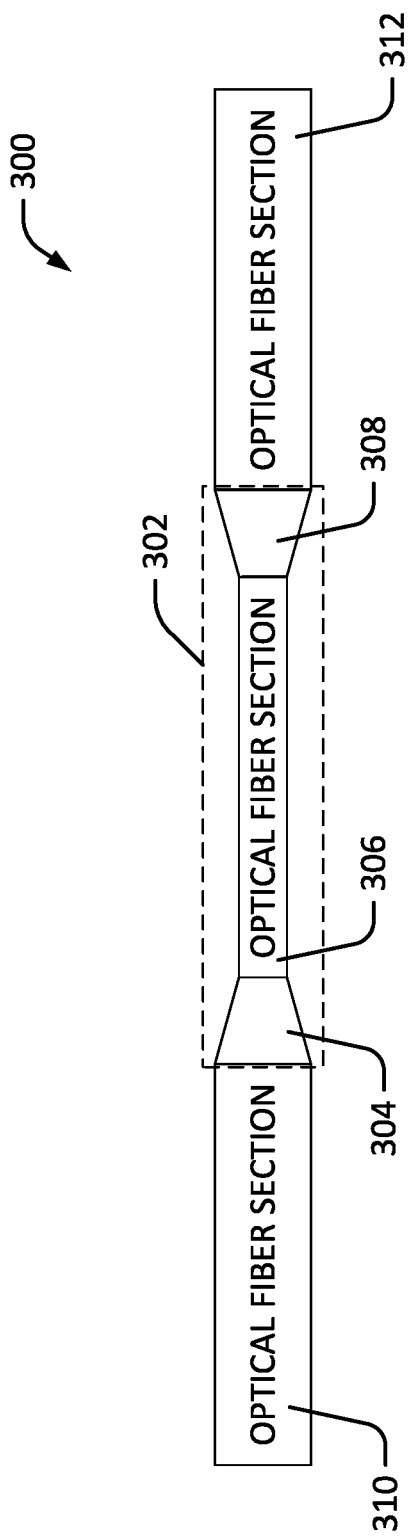
Figure 4:
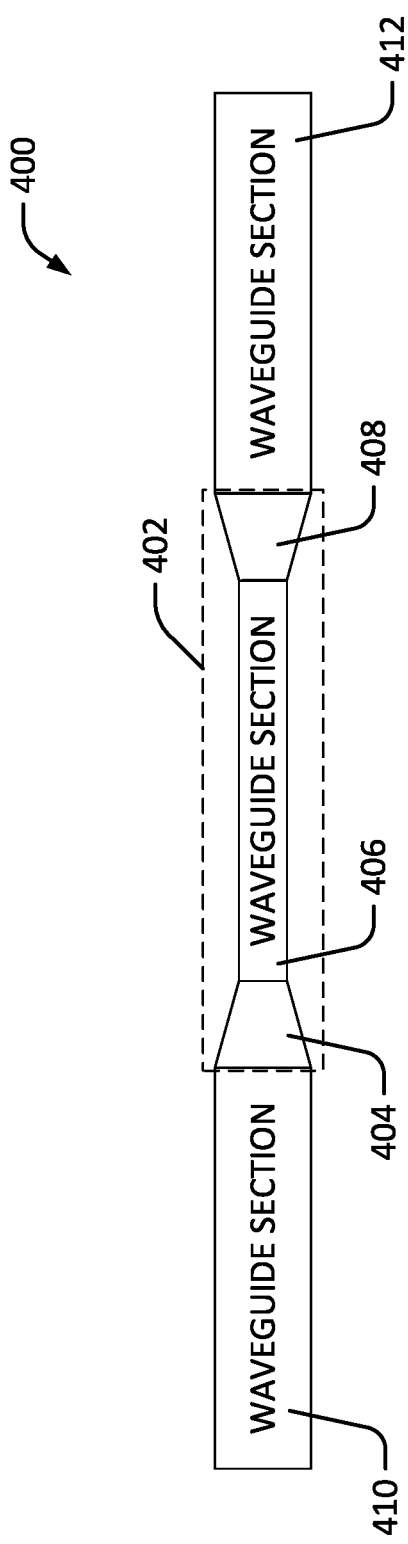
Figure 5:
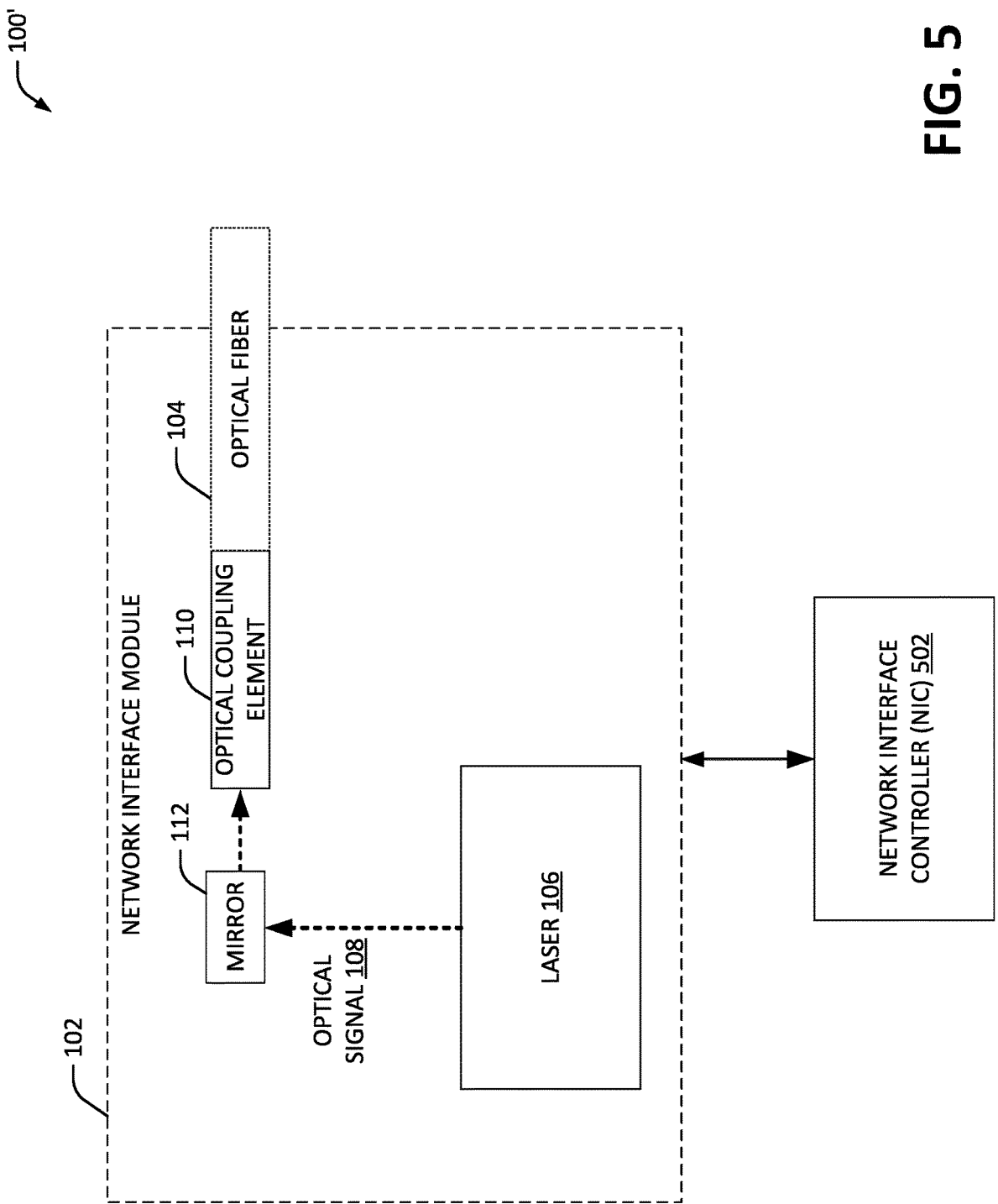
Figure 6:
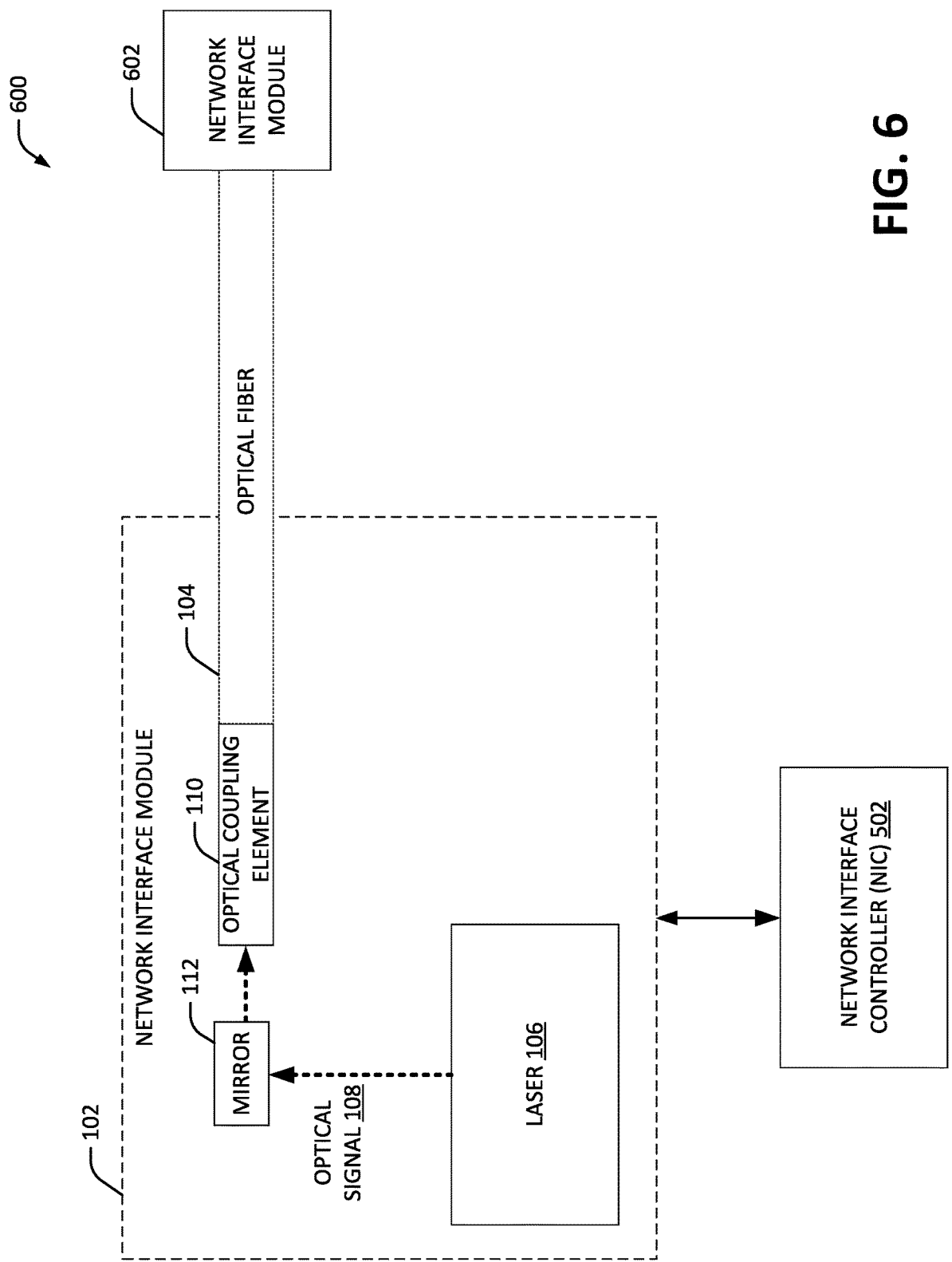
Figure 7:
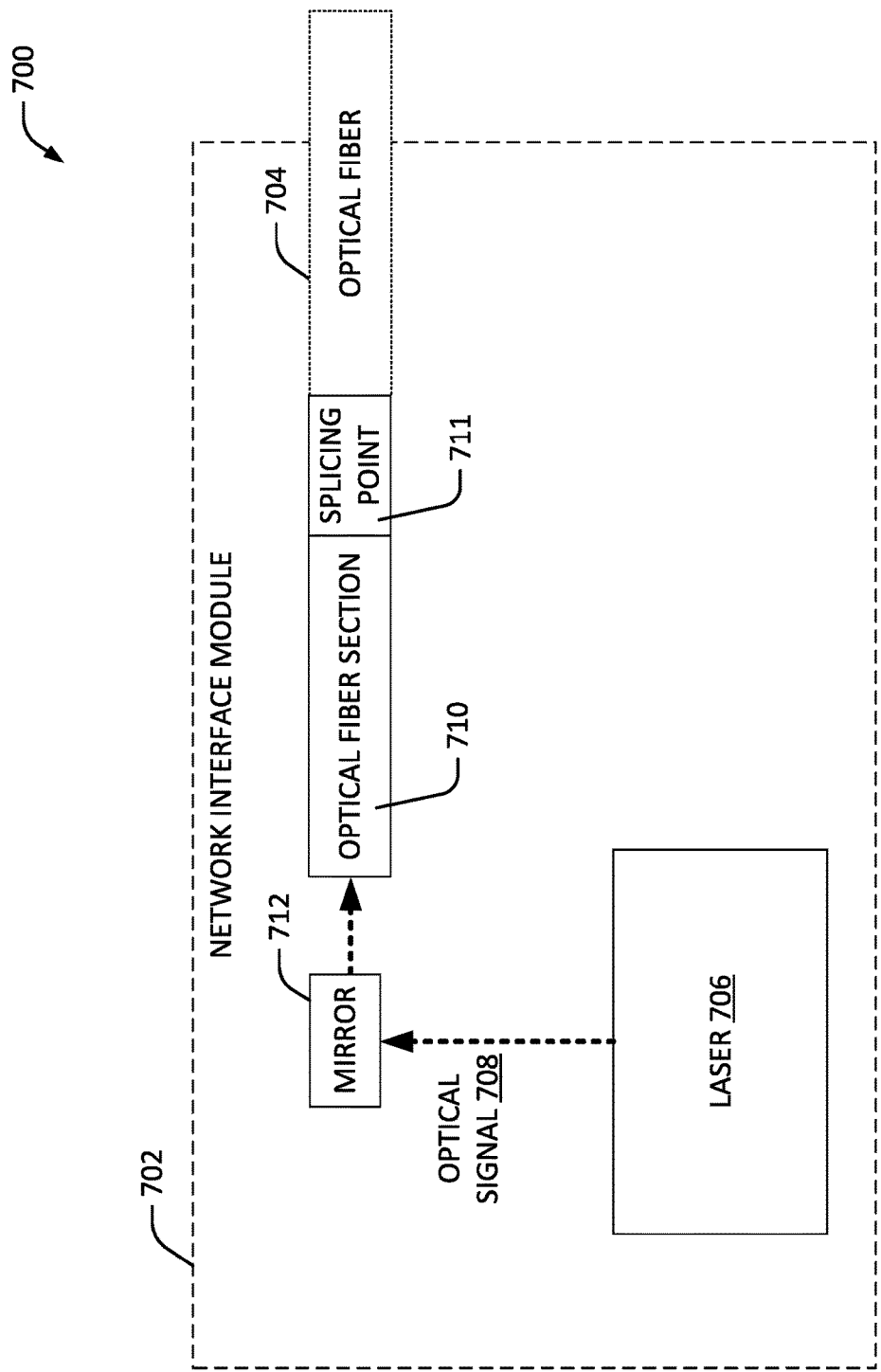
Figure 8:
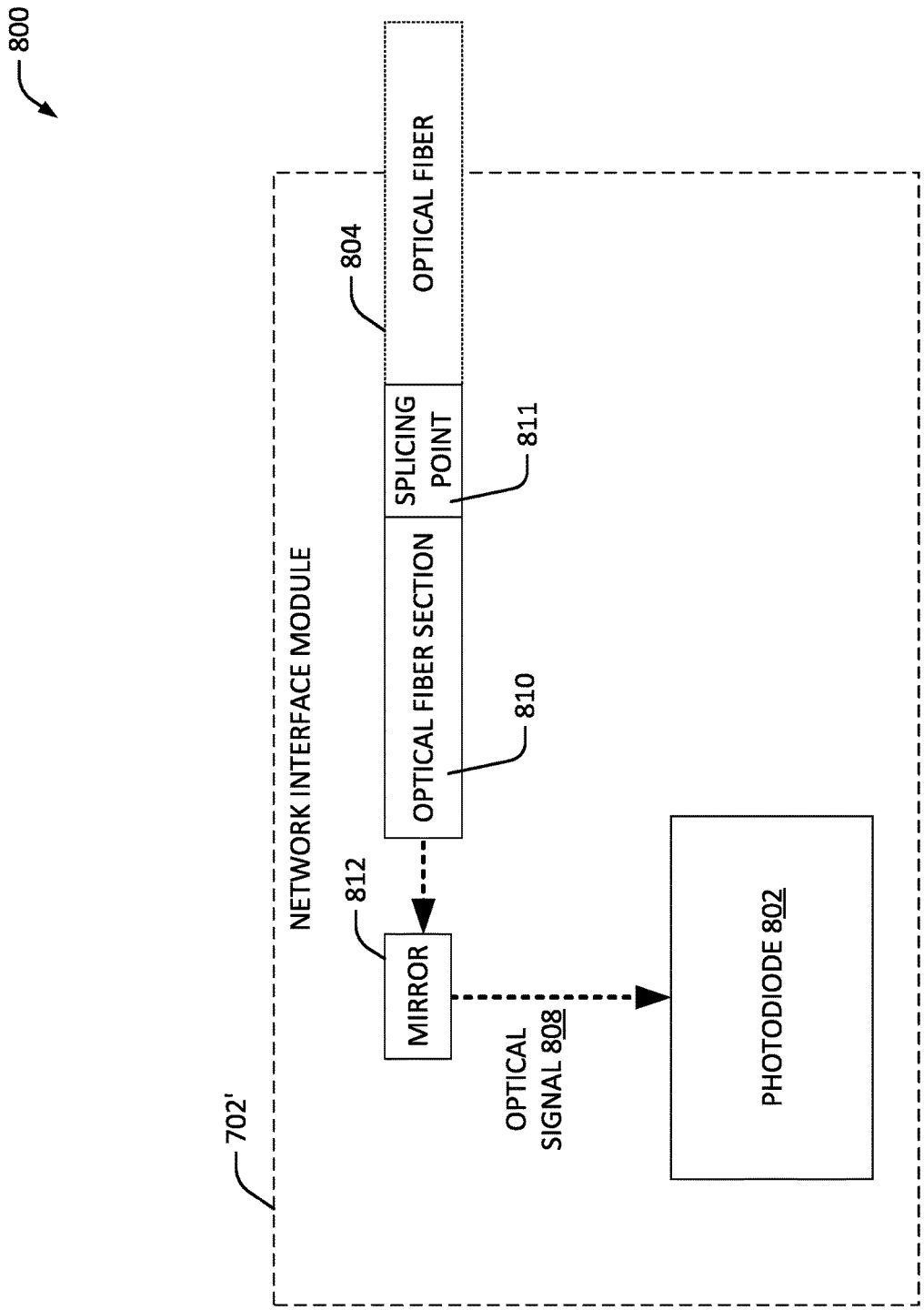
Figure 9:
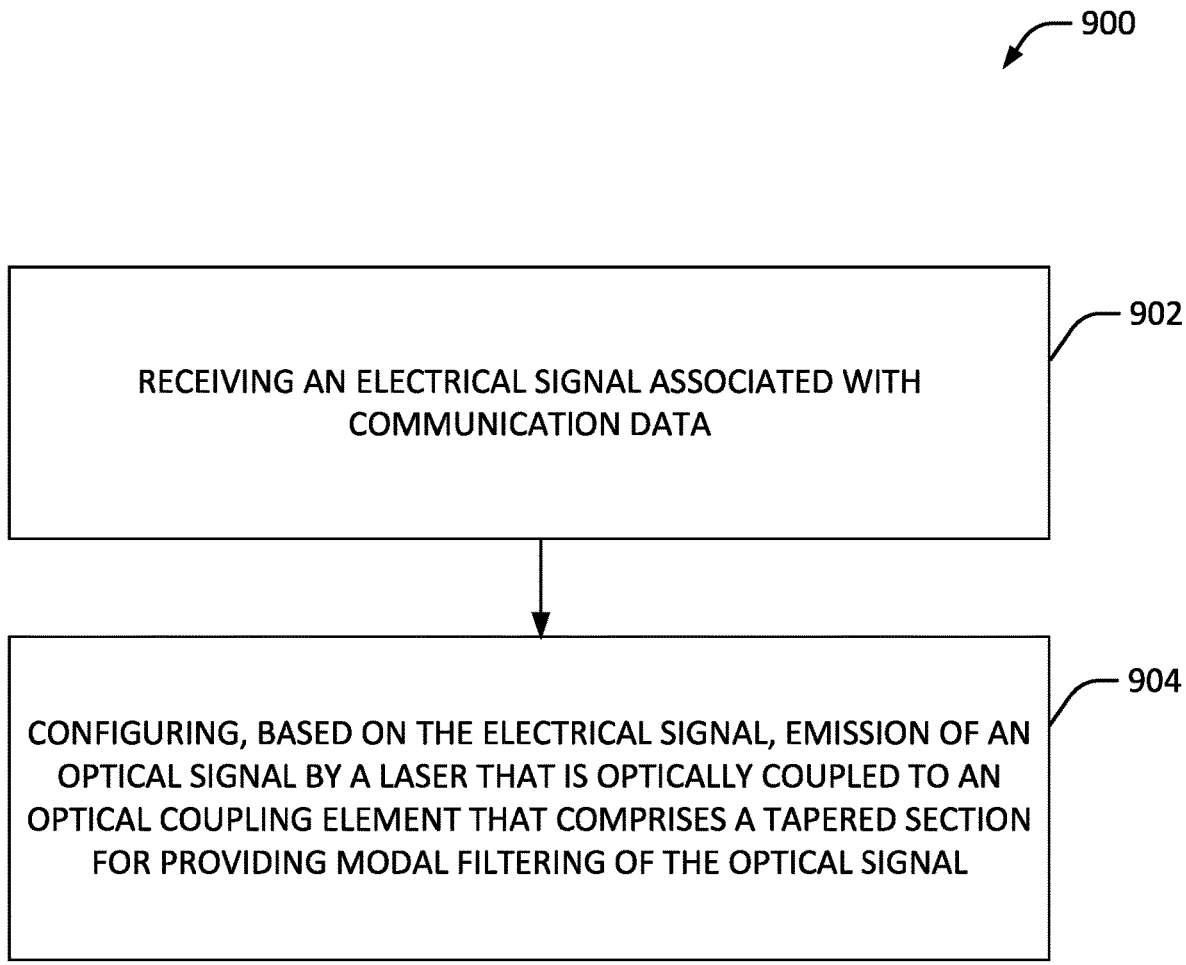
Figure 10:
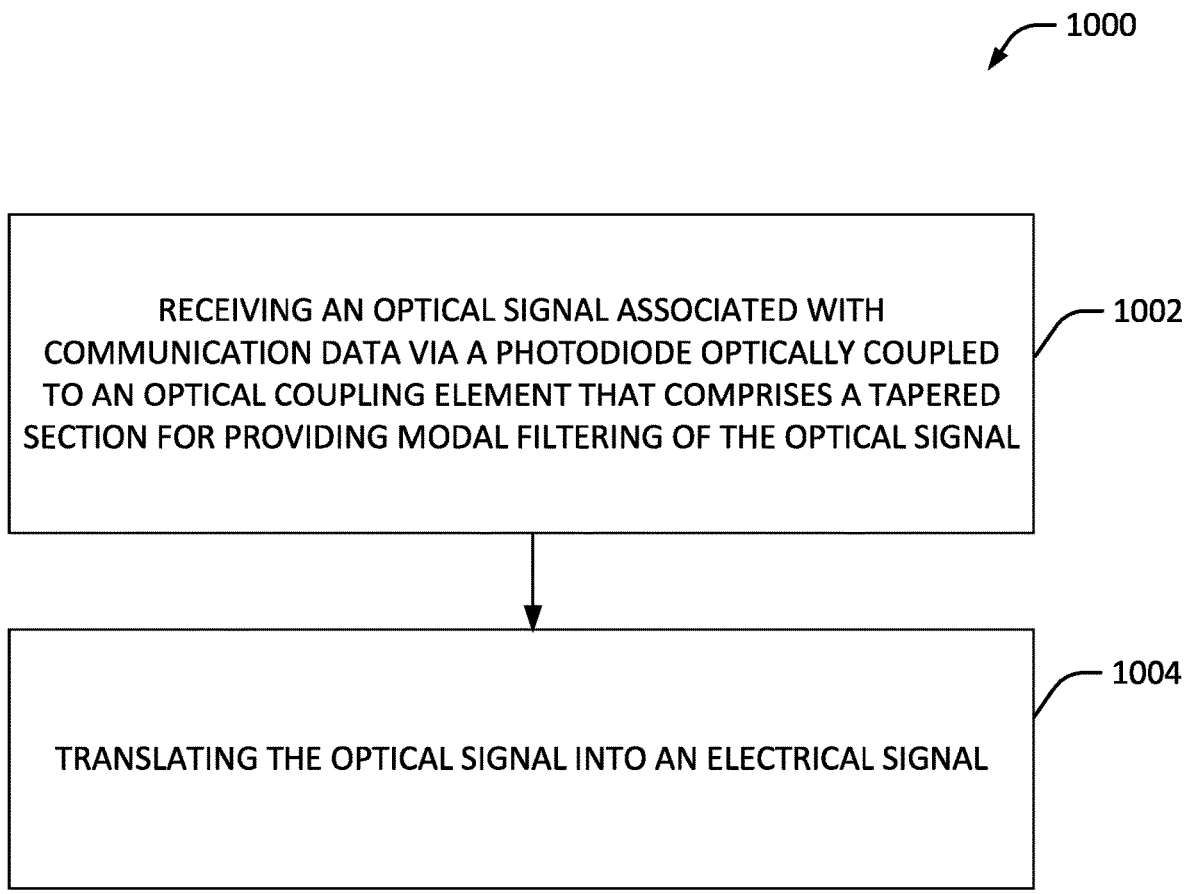

Having thus described the disclosure in general terms, reference will now be made to the accompanying drawings, which are not necessarily drawn to scale, and wherein:

FIG. 1 illustrates an exemplary system that includes a network interface module associated with a laser, in accordance with one or more embodiments of the present disclosure;

FIG. 2 illustrates an exemplary system that includes a network interface module associated with a photodiode, in accordance with one or more embodiments of the present disclosure;

FIG. 3 illustrates an exemplary optical coupling element associated with optical fiber sections, in accordance with one or more embodiments of the present disclosure;

FIG. 4 illustrates an exemplary optical coupling element associated with waveguide sections, in accordance with one or more embodiments of the present disclosure;

FIG. 5 illustrates an exemplary system that includes a network interface module and a network interface controller, in accordance with one or more embodiments of the present disclosure;

FIG. 6 illustrates an exemplary system that includes multiple network interface modules, in accordance with one or more embodiments of the present disclosure;

FIG. 7 illustrates another exemplary system that includes a network interface module associated with a laser, in accordance with one or more embodiments of the present disclosure;

FIG. 8 illustrates another exemplary system that includes a network interface module associated with a photodiode, in accordance with one or more embodiments of the present disclosure;

FIG. 9 is a flowchart illustrating an example method that provides embedded modal filtering for a laser, in accordance with one or more embodiments of the present disclosure;

FIG. 10 is a flowchart illustrating an example method that provides embedded modal filtering for a photodiode, in accordance with one or more embodiments of the present disclosure; and FIG. 11 illustrates an example computing system that may be embedded in the communication system, in accordance with one or more embodiments of the present disclosure.

DETAILED DESCRIPTION

Example embodiments will now be described more fully hereinafter with reference to the accompanying drawings, in which some, but not all, embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "exemplary" and "example" as may be used herein are not provided to convey any qualitative assessment, but instead merely to convey an illustration of an example. Thus, use of any such terms should not be taken to limit the spirit and scope of embodiments of the present invention.

A laser can be employed in an optical interconnect (e.g., a data center optical interconnect) to provide an output laser beam for fiber optic communications with minimal cost and/or minimal power consumption. Characteristics of the output laser beam can also provide an efficient coupling solution with reduced optical interconnect complexity. Furthermore, a geometry of a laser can provide reduced packaging cost and/or reduced packaging complexity.

A laser can also be employed in a wide range of data center optical interconnects, such as short reach multimode links (e.g., up to 100 m), intermediate reach single mode links (e.g., up to 500 m), and long reach single mode links (e.g., greater than 500 m). Typically, short reach multimode link transceivers employ multimode 850 nm lasers and long reach single mode link transceivers employ 1310 nm lasers, for example. A type of laser employed by a transceiver is also typically determined based on modal characteristics of a fiber optic cable (e.g., a single mode optical fiber cable, a multimode optical fiber cable, etc.). In an example, a single mode optical fiber cable (e.g., SMF28e®) can be configured as a single mode at 1310 nm, allowing for high-quality transmission over longer distances. In another example, a multimode optical fiber cable (e.g., an optical multimode 4 (OM4) cable) can be configured for high effective modal bandwidth around 850 nm.

However, conventional laser optical systems (e.g., conventional 1310 nm laser optical systems) generally provide decreased performance for certain fiber optic transmission speeds (e.g., at and above 10 Gb/s). As a result, optical systems (e.g., 1310 nm single mode long-reach optical systems) often employ alternative optical engine solutions such as electro-absorption modulated lasers or directly modulated lasers, which are generally associated with higher cost, power consumption and/or packaging complexity as compared to lasers. Moreover, certain types of fiber optic cables (e.g., single mode optical fiber cables) cannot guarantee single mode operation at certain wavelengths (e.g., at 1060 nm). For example, with certain types of fiber optic cables (e.g., single mode optical fiber cables), partial excitation of a higher order mode (e.g., a linearly polarized propagation mode such as LP11) for the fiber optical fiber can occur, resulting in signal distortion for the fiber optic cable.

Thus, to address these and/or other issues, a coupling element with embedded modal filtering for a laser and/or a photodiode is disclosed herein. The modal filtering related to the laser and/or the photodiode can provide improved performance for fiber optic transmissions. Furthermore, as compared to conventional laser optical systems, embodiments disclosed herein provide for improved performance of fiber optic transmissions via lasers and/or photodiodes. In one or more embodiments, the coupling element with the embedded modal filtering is a laser/photodiode coupler (e.g., a 1060 nm laser/photodiode coupler) enhanced with compact modal filtering capability. In one or more embodiments, the coupling element with the embedded modal filtering provides an improved laser (e.g., an improved 1060 nm laser) for single mode optical fiber cables (e.g., SMF28e® fiber optic links) in a data center. In certain embodiments, a transceiver comprises modal filtering configured to provide LP11 rejection after a laser of the transceiver. In certain embodiments, a transceiver comprises modal filtering configured to provide LP11 rejection before a photodetector of the transceiver. In certain embodiments, a transmitter and/or a receiver comprises modal filtering configured to provide a high-quality single mode signal for a fiber optic link. In one or more embodiments, the coupling element comprises a tapered section that provides modal filtering of an optical signal. For example, in an embodiment, the coupling element comprises a tapered optical fiber section and/or a tapered optical fiber core to provide modal filtering of an optical signal. In another embodiment, the coupling element comprises a tapered waveguide section to provide modal filtering of an optical signal.

FIG. 1 illustrates a system 100 that facilitates embedded modal filtering for a laser according to one or more embodiments of the present disclosure. For instance, in one or more embodiments, the system 100 provides a VCSEL transceiver device (e.g., a VCSEL optical transceiver) with embedded modal filtering. The system 100 includes a network interface module 102. The network interface module 102 can be, for example, a transceiver device (e.g., an optical transceiver) that facilitates fiber optic communication. In one or more embodiments, the network interface module 102 can be a pluggable optical transceiver with a set of pins to facilitate connection with an optical fiber 104. The optical fiber 104 can be, for example, a fiber optic communication channel (e.g., a transparent fiber optic connection, a fiber optic wire, etc.) that transmits pulses of infrared light.

In an embodiment, the optical fiber 104 includes a single optical communication channel (e.g., a single fiber optic wire). In another embodiment, the optical fiber 104 includes two or more optical communication channels (e.g., two or more fiber optic wires). In another embodiment, the optical fiber 104 can include, additionally or alternatively, a fiber bundle. However, it is to be appreciated that, in certain embodiments, the optical fiber 104 can be implemented in a different manner to facilitate fiber optic communications via the optical fiber 104. In an embodiment, the optical fiber 104 can be a single mode optical fiber cable (e.g., a SMF28e® fiber optic cable). In another embodiment, the optical fiber 104 can be a multimode optical fiber cable (e.g., an OM3 fiber optic cable, an OM4 fiber optic cable, or an OM5 fiber optic cable). However, it is to be appreciated that, in certain embodiments, the optical fiber 104 can be implemented as a different type of optical fiber.

In an embodiment, the network interface module 102 includes a laser 106. The laser 106 can be, for example, an optical transceiver laser. In one or more embodiments, the laser 106 can be configured to emit an optical signal 108. The optical signal 108 can be, for example, an optical signal associated with data for transmission via the optical fiber 104. For example, in one or more embodiments, the optical signal 108 can be an electromagnetic signal that transmits data at 10G, 25G, 40G, 50G, 100G, 200G, 400G or another data speed via the optical fiber 104. In one or more embodiments, the laser 106 can emit the optical signal 108 at a particular wavelength (e.g., 1060 nm or another wavelength). In an embodiment, the laser 106 can be attached to a substrate such as, for example, a printed circuit board of the network interface module 102.

In certain embodiments, the laser 106 can be configured as a vertically coupled laser. Alternatively, in certain embodiments, the laser 106 can be configured as a horizontally coupled laser. In an embodiment, the laser 106 is a semiconductor laser diode that emits the optical signal 108 vertically with respect to a top surface of the laser 106. For example, in certain embodiments, the laser 106 can be a vertical cavity surface emitting laser (VCSEL). In one or more embodiments, the laser 106 can include a photodiode, a set of mirrors (e.g., a set of distributed Bragg reflector mirrors) parallel to a wafer surface, one or more oxide layers, a gain region, and/or a laser cavity (e.g., an active region) to facilitate generation of a laser light for the optical signal 108. In one or more embodiments, the set of mirrors (e.g., the set of distributed Bragg reflector mirrors) of the laser 106 can include a set of layers with alternating high refractive indices and low refractive indices to facilitate generation of a laser light for the optical signal 108. In another embodiment, the laser 106 is a semiconductor laser diode that emits the optical signal 108 horizontally with respect to a top surface of the laser 106.

An optical path of the optical signal 108 emitted by the laser 106 can include an optical coupling element 110. For instance, the optical coupling element 110 can be configured to receive the optical signal 108 emitted by the laser 106. The optical coupling element 110 can be configured to be connected to the optical fiber 104 such that, in operation, the optical signal 108 is transmitted from the laser 106 to the optical fiber 104 via the optical coupling element 110. In one or more embodiments, the optical coupling element 110 is a fiber coupler housing or another module attached to the optical fiber 104. In an embodiment, the optical fiber 104 is glued to the optical coupling element 110. In another embodiment, the optical fiber 104 is welded to the optical coupling element 110. In yet another embodiment, the optical fiber 104 is mechanically detachable from the optical coupling element 110. For example, in certain embodiments, a portion of the optical coupling element 110 can be attached to the optical fiber 104 and another portion of the optical coupling element 110 can be permanently affixed to a circuit board (e.g., a printed circuit board). However, it is to be appreciated that, in certain embodiments, the optical fiber 104 can be attached to the optical coupling element 110 using a different technique.

In one or more embodiments, the coupling element 110 comprises a tapered section that provides modal filtering of the optical signal 108. For example, the tapered section of the coupling element 110 can be a modal filter configured for modal filtering of the optical signal 108. The modal filter can be configured to filter one or more fiber modes (e.g., one or more linearly polarized propagation modes) to provide single mode operation for the optical fiber 104. In an embodiment, the modal filtering can be configured to reject a first type of linearly polarized (LP) mode associated with the optical signal 108 and accept a second type of LP mode associated with the optical signal 108. For instance, in an embodiment, the modal filtering can be configured to reject an LP11 mode associated with a first propagation constant for the optical signal 108 and accept an LP01 mode (e.g., a fundamental mode) associated with a second propagation constant for the optical signal 108 that is greater than the first propagation constant. In certain embodiments, the optical coupling element 110 can interface a first optical fiber section associated with a first core diameter and a second optical fiber section associated with a second core diameter. In certain embodiments, the optical coupling element 110 interfaces the first optical fiber section and the second optical fiber section via the tapered section to provide the modal filtering of the optical signal 108. In one or more embodiments, the laser 106 can be configured as a single-mode laser that outputs the optical signal 108 as an output beam configured to facilitate the modal filtering. In certain embodiments, the laser 106 can be configured as a single-mode laser that outputs the optical signal 108 as a Gaussian-shaped output beam to facilitate the modal filtering. As such, by providing the modal filtering via the coupling element 110, noise and/or distortion associated with the optical signal 108 can be reduced.

In an embodiment, the tapered section of the coupling element 110 can include at least one tapered optical fiber section associated with the modal filtering. For example, the tapered section of the coupling element 110 can include a tapered optical fiber core. In one or more embodiments, the tapered section of the coupling element 110 can include a first optical fiber section associated with a first core diameter, a second optical fiber section associated with a second core diameter, and a third optical fiber section associated with the first core diameter. The second core diameter can be less than the first core diameter. For example, the first core diameter can be approximately 8 μm and the second core diameter can be approximately 3 μm. In another embodiment, the tapered section of the coupling element 110 can include a first optical fiber section associated with a first optical fiber shape, a second optical fiber section associated with a second optical fiber shape, and a third optical fiber section associated with the first optical fiber shape. The second optical fiber shape can be different than the first optical fiber shape. For example, the second optical fiber shape can correspond to a non-linear portion (e.g., a bent portion) of optical fiber and the first optical fiber shape can correspond to a linear portion (e.g., an unbent portion) of optical fiber. In certain embodiments, the non-linear portion (e.g., the bent portion) of the optical fiber can have a bending radius that is less than 1 centimeter. However, it is to be appreciated that, in certain embodiments, the non-linear portion (e.g., the bent portion) of the optical fiber can have a different bending radius and/or other non-linear characteristics to facilitate the modal filtering.

In another embodiment, the tapered section of the coupling element 110 can include at least one tapered waveguide section associated with the modal filtering. For example, the tapered section of the coupling element 110 can include a first waveguide section associated with a first waveguide size, a second waveguide section associated with a second waveguide size, and a third waveguide section associated with the first waveguide size. The second waveguide size can be less than the first waveguide size. For example, in an embodiment, the first waveguide size can correspond to 4×4 μm$^2$ and the second waveguide size can correspond to 2×2 μm$^2$ or less. However, it is to be appreciated that, in certain embodiments, the first waveguide size and/or the second waveguide size can be a different waveguide size. In another embodiment, the tapered section of the coupling element 110 can include a first waveguide section associated with a first waveguide shape, a second waveguide section associated with a second waveguide shape, and a third waveguide section associated with the first waveguide shape. The second waveguide shape can be different than the first waveguide shape. For example, the second waveguide shape can correspond to a non-linear portion (e.g., a bent portion) of a waveguide and the first waveguide shape can correspond to a linear portion (e.g., an unbent portion) of the waveguide.

In certain embodiments, the optical coupling element 110 can be attached to the network interface module 102 and/or a mechanical structure of the network interface module 102 via an adhesive material. For example, in certain embodiments, the optical coupling element 110 can be attached to a V-groove mechanical structure of the network interface module 102 via an adhesive material. A V-groove mechanical structure is a V-groove assembly that includes a set of V-grooves that hold respective optical fibers to facilitate spacing and/or shaping of the optical fibers. As such, in certain embodiments, the optical coupling element 110 can be adhered within a V-groove of a V-groove mechanical structure using an adhesive material. The adhesive material can have a refractive index configured for the modal filtering. In a non-limiting example, the refractive index of the adhesive material can be approximately 1.70 to facilitate the modal filtering. In certain embodiments, the adhesive material can be a glue material (e.g., a high refractive index glue) with metal particles to provide a further degree the modal filtering. For example, a refractive index of the adhesive material and/or metal particles of the adhesive material can provide increased filtering of a certain type of LP mode (e.g., an LP11 mode) to enhance the modal filtering provided by the tapered section. In a non-limiting example, the adhesive material can be an optical adhesive liquid that can be cured to a clear film once exposed to ultraviolet light and/or visible light. In another non-limiting example, the adhesive material can be a semiconductor grade epoxy. In certain embodiments, the metal particles of the adhesive material can include gold particles, copper particles, silver particles, silver palladium particles, and/or other metal particles.

In one or more embodiments, the laser 106 is coupled directly and horizontally to the optical coupling element 110. Alternatively, in one or more embodiments, an optical path of the optical signal 108 can include a mirror 112 to facilitate transmission of the optical signal 108 via the optical fiber 104. For example, the mirror 112 can be an optical path component (e.g., a reflective surface) that redirects and/or guides the optical signal 108 emitted from the laser 106 to the optical coupling element 110 and/or the optical fiber 104.

FIG. 2 illustrates a system 200 that facilitates embedded modal filtering for a photodiode according to one or more embodiments of the present disclosure. For instance, in one or more embodiments, the system 200 provides a photodiode transceiver device (e.g., a photodiode optical transceiver) with embedded modal filtering. The system 200 includes a network interface module 102'. The network interface module 102' can be, for example, a transceiver device (e.g., an optical transceiver) that facilitates fiber optic communication. In one or more embodiments, the network interface module 102' can be a pluggable optical transceiver with a set of pins to facilitate connection with an optical fiber 204. The optical fiber 204 can be, for example, a fiber optic communication channel (e.g., a transparent fiber optic connection, a fiber optic wire, etc.) that transmits pulses of infrared light. In an embodiment, the network interface module 102' is an alternate embodiment of the network interface module 102.

In an embodiment, the optical fiber 204 includes a single optical communication channel (e.g., a single fiber optic wire). In another embodiment, the optical fiber 204 includes two or more optical communication channels (e.g., two or more fiber optic wires). In another embodiment, the optical fiber 204 can include, additionally or alternatively, a fiber bundle. However, it is to be appreciated that, in certain embodiments, the optical fiber 204 can be implemented in a different manner to facilitate fiber optic communications via the optical fiber 204. In an embodiment, the optical fiber 204 can be a single mode optical fiber cable (e.g., a SMF28e® fiber optic cable). In another embodiment, the optical fiber 204 can be a multimode optical fiber cable (e.g., an OM3 fiber optic cable, an OM4 fiber optic cable, or an OM5 fiber optic cable). However, it is to be appreciated that, in certain embodiments, the optical fiber 204 can be implemented as a different type of optical fiber.

In an embodiment, the network interface module 102' includes a photodiode 202. The photodiode 202 can be, for example, an optical transceiver photodiode. In one or more embodiments, the photodiode 202 can be configured to receive an optical signal 208. The optical signal 208 can be, for example, an optical signal associated with data transmitted via the optical fiber 204. For example, in one or more embodiments, the optical signal 208 can be an electromagnetic signal that transmits data at 10G, 25G, 40G, 50G, 100G, 200G, 400G or another data speed via the optical fiber 204. In one or more embodiments, the photodiode 202 can receive the optical signal 108 at a particular wavelength (e.g., 1060 nm or another wavelength). In an embodiment, the photodiode 202 can be attached to a substrate such as, for example, a printed circuit board of the network interface module 102'. In certain embodiments, the network interface module 102' can additionally include the laser 106 to provide a laser/photodiode transceiver device (e.g., a laser/photodiode optical transceiver) with embedded modal filtering. Alternatively, in certain embodiments, the network interface module 102 can additionally include the photodiode 202 to provide a laser/photodiode transceiver device (e.g., a laser/photodiode optical transceiver) with embedded modal filtering.

In an embodiment, the photodiode 202 is a semiconductor device configured to receive energy particles and/or photons of the optical signal 108. In one or more embodiments, the photodiode 202 is a P-N junction diode that comprises at least a substrate (e.g., an N-type substrate), a buffer layer (e.g., an N-type buffer layer), an absorption layer (e.g., an N-type absorption layer) and/or a P layer.

An optical path of the optical signal 208 received by the photodiode 202 can include an optical coupling element 210. For instance, the optical coupling element 210 can be configured to receive the optical signal 208 transmitted via the optical fiber 204. The optical coupling element 210 can be configured to be connected to the optical fiber 204 such that, in operation, the optical signal 208 is transmitted from the optical fiber 204 to the photodiode 202 via the optical coupling element 210.

In one or more embodiments, the coupling element 210 comprises a tapered section that provides modal filtering of the optical signal 208. For example, the tapered section of the coupling element 210 can be a modal filter configured for modal filtering of the optical signal 208. The modal filtering can be configured to filter one or more fiber modes (e.g., one or more linearly polarized propagation modes) to provide single mode operation for the optical fiber 204. In an embodiment, modal filtering can be configured to reject an LP11 mode associated with the optical signal 208. In certain embodiments, the optical coupling element 210 can interface a first optical fiber section associated with a first core diameter and a second optical fiber section associated with a second core diameter. In certain embodiments, the optical coupling element 210 interfaces the first optical fiber section and the second optical fiber section via the tapered section to provide the modal filtering of the optical signal 208.

In an embodiment, the tapered section of the coupling element 210 can include at least one tapered optical fiber section associated with the modal filtering. In another embodiment, the tapered section of the coupling element 210 can include a tapered optical fiber core. In another embodiment, the tapered section of the coupling element 210 can include at least one tapered waveguide section associated with the modal filtering. In another embodiment, the tapered section of the coupling element 210 can include a first optical fiber section associated with a first core diameter, a second optical fiber section associated with a second core diameter, and a third optical fiber section associated with the first core diameter. In another embodiment, the tapered section of the coupling element 210 can include a first optical fiber section associated with a first optical fiber shape, a second optical fiber section associated with a second optical fiber shape, and a third optical fiber section associated with the first optical fiber shape.

In another embodiment, the tapered section of the coupling element 210 can include a first waveguide section associated with a first waveguide size, a second waveguide section associated with a second waveguide size, and a third waveguide section associated with the first waveguide size. In another embodiment, the tapered section of the coupling element 210 can include a first waveguide section associated with a first waveguide shape, a second waveguide section associated with a second waveguide shape, and a third waveguide section associated with the first waveguide shape.

In certain embodiments, the optical coupling element 210 can be attached to the network interface module 102' and/or a mechanical structure of the network interface module 102' via an adhesive material. For example, in certain embodiments, the optical coupling element 210 can be attached to a V-groove mechanical structure of the network interface module 102' via an adhesive material. A V-groove mechanical structure is a V-groove assembly that includes a set of V-grooves that hold respective optical fibers to facilitate spacing and/or shaping of the optical fibers. As such, in certain embodiments, the optical coupling element 210 can be adhered within a V-groove of a V-groove mechanical structure using an adhesive material. The adhesive material can have a refractive index configured for the modal filtering. In certain embodiments, the adhesive material can be a glue material (e.g., a high refractive index glue) with metal particles to provide a further degree the modal filtering. For example, a refractive index of the adhesive material and/or metal particles of the adhesive material can provide increased filtering of a certain type of LP mode (e.g., an LP11 mode) to enhance the modal filtering provided by the tapered section.

In one or more embodiments, an optical path of the optical signal 208 can include a mirror 212 to facilitate transmission of the optical signal 208 via the optical fiber 204. For example, the mirror 212 can be an optical path component (e.g., a reflective surface) that redirects and/or guides the optical signal 208 from the optical coupling element 210 and to the photodiode 202.

FIG. 3 illustrates an optical coupling element 300 that facilitates embedded modal filtering for a laser and/or a photodiode according to one or more embodiments of the present disclosure. The optical coupling element 300 can correspond to the optical coupling element 110 and/or the optical coupling element 210. The optical coupling element 300 includes a tapered section 302 that provides modal filtering of an optical signal (e.g., the optical signal 108 or the optical signal 208). For example, the modal filtering provided by the tapered section 302 can be configured to filter one or more fiber modes (e.g., one or more linearly polarized propagation modes) to provide single mode operation for an optical fiber 104. In an embodiment, modal filtering provided by the tapered section 302 can be configured to reject an LP11 mode associated with an optical signal.

In one or more embodiments, the tapered section 302 includes a first optical fiber section 304, a second optical fiber section 306, and a third optical fiber section 308. The first optical fiber section 304 can be tapered from a size of a fourth optical fiber section 310 and to a size of the second optical fiber section 306. Furthermore, the third optical fiber section 308 can be tapered from a size of a fifth optical fiber section 312 and to a size of the second optical fiber section 306. For example, in one or more embodiments, the second optical fiber section 306 can be a first tapered optical fiber core and the third optical fiber section 308 can be a second tapered optical fiber core. Furthermore, in one or more embodiments, the fourth optical fiber section 310 can be associated with a first core diameter, the second optical fiber section 306 can be associated with a second core diameter, and the fifth optical fiber section 312 can be associated with the first core diameter. The second core diameter can be smaller than the first core diameter. As such, the tapered section 302 can include an optical fiber that tapers from a larger optical fiber cross-section to a smaller optical fiber cross-section (e.g., a first taper), through a constant smaller optical fiber cross-section, and then tapers from the smaller optical fiber cross-section to the larger optical fiber cross-section (e.g., a second taper). In an embodiment, the first core diameter can be approximately 8 μm and the second core diameter can be approximately 3 μm (e.g., a range from 2 μm to 4 μm). Additionally or alternatively, in one or more embodiments, the fourth optical fiber section 310 can be associated with a first optical fiber shape, the second optical fiber section 306 can be associated with a second optical fiber shape, and the fifth optical fiber section 312 can be associated with the first optical fiber shape. In an example, the first optical fiber shape can be a linear optical fiber shape and the second optical fiber shape can be a non-linear optical fiber shape. Additionally or alternatively, in one or more embodiments, a length of the second optical fiber section 306 can be configured for optimal modal filtering. For example, in certain embodiments, a length of the second optical fiber section 306 can be approximately 2 mm to achieve approximately 95% LP11 mode rejection with minimal impact with respect to the LP01 mode. However, it is to be appreciated that, in certain embodiments, a length of the second optical fiber section 306 can be a different length to facilitate the modal filtering.

In an embodiment, an optical signal (e.g., the optical signal 108 emitted by the laser 106) can be received by the fourth optical fiber section 310, transmitted via the tapered section 302, and further transmitted by the fifth optical fiber section 312. Furthermore, in this embodiment, the fifth optical fiber section 312 can be coupled to an optical fiber (e.g., the optical fiber 104). In another embodiment, an optical signal (e.g., the optical signal 208 provided to the photodiode 202) can be received by the fifth optical fiber section 312, transmitted via the tapered section 302, and further transmitted by the fourth optical fiber section 310. Furthermore, in this embodiment, the fifth optical fiber section 312 can be coupled to an optical fiber (e.g., the optical fiber 104).

FIG. 4 illustrates an optical coupling element 400 that facilitates embedded modal filtering for a laser and/or a photodiode according to one or more embodiments of the present disclosure. The optical coupling element 400 can correspond to the optical coupling element 110 and/or the optical coupling element 210. The optical coupling element 400 includes a tapered section 402 that provides modal filtering of an optical signal (e.g., the optical signal 108 or the optical signal 208). For example, the modal filtering provided by the tapered section 402 can be configured to filter one or more fiber modes (e.g., one or more linearly polarized propagation modes) to provide single mode operation for an optical fiber 104. In an embodiment, modal filtering provided by the tapered section 402 can be configured to reject an LP11 mode associated with an optical signal.

In an embodiment, the optical coupling element 400 can correspond to at least a portion of an optical waveguide. For example, in an embodiment, the optical coupling element 400 can be a structure configured to transmit (e.g., propagate) light. In one or more embodiments, an optical waveguide can include a core and/or a cladding. Light can be transmitted via the core. Furthermore, the cladding can be a surrounding medium for the core that is not associated with transmission of light. The core can comprise a higher index of refraction than the cladding, such that, in operation, light is directed by the cladding back toward the core and, light is thereby propagated through the waveguide. In an embodiment, the core can comprise silicon. Additionally, the cladding can include silicon dioxide or silicon nitride. However, it is to be appreciated that, in certain embodiments, the core and/or the cladding can comprise a different type of material such that the core comprises a higher index of refraction than the cladding.

In one or more embodiments, the tapered section 402 includes a first waveguide section 404, a second waveguide section 406, and a third waveguide section 408. The first waveguide section 404 can be tapered from a size of a fourth waveguide section 410 and to a size of the second waveguide section 406. Furthermore, the third waveguide section 408 can be tapered from a size of a fifth waveguide section 412 and to a size of the second waveguide section 406. For example, in one or more embodiments, the first waveguide section 404 can be a first tapered waveguide section and the third waveguide section 408 can be a second tapered waveguide section. Furthermore, in one or more embodiments, the fourth waveguide section 410 can be associated with a first waveguide section size (e.g., a first waveguide core size), the second waveguide section 406 can be associated with a second waveguide section size (e.g., a second waveguide core size), and the fifth waveguide section 412 can be associated with the first waveguide section size (e.g., the first waveguide core size). The second waveguide section size can be smaller than the first waveguide section size. Additionally or alternatively, in one or more embodiments, the fourth waveguide section 410 can be associated with a first waveguide section shape (e.g., a first waveguide core and/or shape), the second waveguide section 406 can be associated with a second waveguide section shape (e.g., a second waveguide core and/or shape), and the fifth waveguide section 412 can be associated with the first waveguide section shape (e.g., the first waveguide core and/or shape). In an example, the first waveguide section shape can be a linear waveguide section shape and the second waveguide shape can be a non-linear waveguide section shape. In a non-limiting example, the first waveguide section 404, the second waveguide section 406, the third waveguide section 408, the fourth waveguide section 410, and/or the fifth waveguide section 412 can be an embedded glass waveguide.

In an embodiment, an optical signal (e.g., the optical signal 108 emitted by the laser 106) can be received by the fourth waveguide section 410, transmitted via the tapered section 402, and further transmitted by the fifth waveguide section 412. Furthermore, in this embodiment, the fifth waveguide section 412 can be coupled to an optical fiber (e.g., the optical fiber 104). In another embodiment, an optical signal (e.g., the optical signal 208 provided to the photodiode 202) can be received by the fifth waveguide section 412, transmitted via the tapered section 402, and further transmitted by the fourth waveguide section 410. Furthermore, in this embodiment, the fifth waveguide section 412 can be coupled to an optical fiber (e.g., the optical fiber 104).

FIG. 5 illustrates a system 100' that facilitates embedded modal filtering for a laser according to one or more embodiments of the present disclosure. The system 100' can be an alternate embodiment of the system 100. The system 100' includes the network interface module 102. Furthermore, the system 100' additionally includes a network interface controller (NIC) 502. The network interface module 102 can include the laser 106, the optical coupling element 110 and/or the mirror 112. Furthermore, the optical coupling element 110 can be coupled to the optical fiber 104.

In an embodiment, the NIC 502 can be coupled (e.g., physically coupled and/or communicatively coupled) to the network interface module 102. In another embodiment, the network interface module 102 can include the NIC 502. The NIC 502 can be configured to manage transmission of the optical signal 108 via the optical fiber 104. In an embodiment, the NIC 502 can be configured to control emission of the optical signal 108 via the laser 106. In certain embodiments, the NIC 502 can be configured to manage timing of transmission of the optical signal 108. In another embodiment, the NIC 502 can be configured to select the optical signal 108 for transmission via the optical fiber 104. In one or more embodiments, the NIC 502 can be configured to manage one or more inputs provided to the laser 106 and/or one or more settings for the laser 106 to facilitate emission of the optical signal 108 via the laser 106.

In one or more embodiments, control from the NIC 502 to the network interface module 102 can be realized based on an electrical lane control signal and/or by sending one or more different data streams to the laser 106. In one or more embodiments, the NIC 502 can determine a polarization state (e.g., control a state of a polarization scrambler) for the laser 106. In one or more embodiments, the NIC 502 can transmit one or more control signal (e.g., one or more electrical control signals) to the laser 106 to facilitate transmission of the optical signal 108. In one or more embodiments, the NIC 502 can additionally or alternatively configure the laser 106 with certain data to facilitate emission of the optical signal 108.

FIG. 6 illustrates a system 600 that facilitates embedded modal filtering for a laser according to one or more embodiments of the present disclosure. The system 600 can be an alternate embodiment of the system 100 and/or the system 100'. The system 600 includes the network interface module 102, the NIC 502 and a network interface module 602. The network interface module 102 can include the laser 106, the optical coupling element 110 and/or the mirror 112. Furthermore, the optical coupling element 110 can be coupled to a first side (e.g., a transmission side) of the optical fiber 104 and the network interface module 602 can be coupled to a second side (e.g., a receiver side) of the optical fiber 104. For example, in one or more embodiments, the network interface module 102 is coupled to the optical fiber 104. Additionally, in one or more embodiments, the network interface module 402 is coupled to the optical fiber 104.

In an embodiment, the network interface module 102 can be a first transceiver device (e.g., a first optical transceiver) coupled to the optical fiber 104 and the network interface module 602 can be a second transceiver device (e.g., a second optical transceiver) coupled to the optical fiber 104. In certain embodiments, the network interface module 102 can be employed as a transmitter device that transmits the optical signal 108 (e.g., communication data) to the network interface module 602 (e.g., a receiver device) via the optical fiber 104. For example, in one or more embodiments, the network interface module 602 can receive the optical signal 108 via the optical fiber 104. In one or more embodiments, the network interface module 602 can be configured similar to the network interface module 102'. For example, in an embodiment, the network interface module 602 can include the photodiode 202, the optical element 210 and/or a mirror 212.

FIG. 7 illustrates a system 700 that facilitates embedded modal filtering for a laser according to one or more embodiments of the present disclosure. For instance, in one or more embodiments, the system 700 provides a VCSEL transceiver device (e.g., a VCSEL optical transceiver) with embedded modal filtering. The system 700 includes a network interface module 702. The network interface module 702 can be, for example, a transceiver device (e.g., an optical transceiver) that facilitates fiber optic communication. In one or more embodiments, the network interface module 702 can be a pluggable optical transceiver with a set of pins to facilitate connection with an optical fiber 704. The optical fiber 704 can be, for example, a fiber optic communication channel (e.g., a transparent fiber optic connection, a fiber optic wire, etc.) that transmits pulses of infrared light.

In an embodiment, the optical fiber 704 includes a single optical communication channel (e.g., a single fiber optic wire). In another embodiment, the optical fiber 704 includes two or more optical communication channels (e.g., two or more fiber optic wires). In another embodiment, the optical fiber 704 can include, additionally or alternatively, a fiber bundle. However, it is to be appreciated that, in certain embodiments, the optical fiber 704 can be implemented in a different manner to facilitate fiber optic communications via the optical fiber 704. In an embodiment, the optical fiber 704 can be a single mode optical fiber cable (e.g., a SMF28e® fiber optic cable). In another embodiment, the optical fiber 704 can be a multimode optical fiber cable (e.g., an OM3 fiber optic cable, an OM4 fiber optic cable, or an OM5 fiber optic cable). However, it is to be appreciated that, in certain embodiments, the optical fiber 704 can be implemented as a different type of optical fiber.

In an embodiment, the network interface module 702 includes a laser 706. The laser 706 can be, for example, an optical transceiver laser. In one or more embodiments, the laser 706 can be configured to emit an optical signal 708. The optical signal 708 can be, for example, an optical signal associated with data for transmission via the optical fiber 704. For example, in one or more embodiments, the optical signal 708 can be an electromagnetic signal that transmits data at 10G, 25G, 40G, 50G, 100G, 200G, 400G or another data speed via the optical fiber 704. In one or more embodiments, the laser 706 can emit the optical signal 708 at a particular wavelength (e.g., 1060 nm or another wavelength). In an embodiment, the laser 706 can be attached to a substrate such as, for example, a printed circuit board of the network interface module 702.

In certain embodiments, the laser 706 can be configured as a vertically coupled laser. Alternatively, in certain embodiments, the laser 706 can be configured as a horizontally coupled laser. In an embodiment, the laser 706 is a semiconductor laser diode that emits the optical signal 708 vertically with respect to a top surface of the laser 706. For example, in certain embodiments, the laser 106 can be a VCSEL. In one or more embodiments, the laser 706 can include a photodiode, a set of mirrors (e.g., a set of distributed Bragg reflector mirrors) parallel to a wafer surface, one or more oxide layers, a gain region, and/or a laser cavity (e.g., an active region) to facilitate generation of a laser light for the optical signal 708. In one or more embodiments, the set of mirrors (e.g., the set of distributed Bragg reflector mirrors) of the laser 706 can include a set of layers with alternating high refractive indices and low refractive indices to facilitate generation of a laser light for the optical signal 708. In another embodiment, the laser 706 is a semiconductor laser diode that emits the optical signal 108 horizontally with respect to a top surface of the laser 706.

An optical path of the optical signal 708 emitted by the laser 706 can include an optical fiber section 710. For instance, the optical fiber section 710 can be configured to receive the optical signal 708 emitted by the laser 706. The optical fiber section 710 can be configured to be connected to the optical fiber 704 via a splicing point 711 such that, in operation, the optical signal 708 is transmitted from the laser 706 to the optical fiber 704 via the optical fiber section 710 and the splicing point 711. In an aspect, the optical fiber section 710 can interface to the optical fiber 704 through the splicing point 711. For instance, the optical fiber section 710 can collect single model light associated with the optical signal 708 and can provide the optical signal 708 to the optical fiber 704 via the splicing point 711. In certain embodiments, the splicing point 711 can be a connector that connects the optical fiber section 710 and the optical fiber 704. In certain embodiments, the splicing point 711 provide a fusion-splice between the optical fiber section 710 and the optical fiber 704. In one or more embodiments, the splicing point 711 can be configured such that only the fundamental mode for the optical signal 708 is excited in the optical fiber 704. For example, in one or more embodiments, the splicing point 711 can be configured such that optical power is coupled to the LP01 mode within the optical fiber 704. In a non-limiting example, the optical fiber section 710 can be a single-mode optical fiber at 1060 nm. In certain embodiments, the optical fiber section 710 and the splicing point 711 can be implemented as a fiber optic pigtail where the optical fiber section 710 is an optical fiber that is terminated by the splicing point 711 configured as a connector.

In one or more embodiments, the optical fiber section 710 and/or the splicing point 711 provide modal filtering of the optical signal 708. For example, the optical fiber section 710 and/or the splicing point 711 can be configured to filter one or more fiber modes (e.g., one or more linearly polarized propagation modes) to provide single mode operation for the optical fiber 704. In an embodiment, the modal filtering can be configured to reject a first type of LP mode associated with the optical signal 708 and accept a second type of LP mode associated with the optical signal 708. For instance, in an embodiment, the modal filtering can be configured to reject an LP11 mode associated with a first propagation constant for the optical signal 708 and accept an LP01 mode (e.g., a fundamental mode) associated with a second propagation constant for the optical signal 708 that is greater than the first propagation constant. In certain embodiments, the optical fiber section 710 and/or the splicing point 711 can correspond to an optical coupling element configured to receive the optical signal 708 emitted by the laser 706. In certain embodiments, the optical coupling element associated with the optical fiber section 710 and/or the splicing point 711 can be configured to be connected to the optical fiber 704 such that, in operation, the optical signal 708 is transmitted from the laser 706 to the optical fiber 704 via the optical coupling element. In certain embodiments, the optical coupling element associated with the optical fiber section 710 and/or the splicing point 711 can interface a first optical fiber section associated with a first core diameter and a second optical fiber section associated with a second core diameter. For example, in certain embodiments, the optical fiber section 710 can be the first optical fiber section associated with the first core diameter and the optical fiber 704 can be the second optical fiber section associated with the second core diameter. In certain embodiments, the optical coupling element associated with the optical fiber section 710 and/or the splicing point 711 can provide modal filtering of the optical signal 708. In certain embodiments, the optical coupling element associated with the optical fiber section 710 and/or the splicing point 711 interfaces the first optical fiber section and the second optical fiber section via fusion-splicing associated with the splicing point 711 to provide the modal filtering of the optical signal 708. In one or more embodiments, the laser 706 can be configured as a single-mode laser that outputs the optical signal 708 as an output beam configured to facilitate the modal filtering. In certain embodiments, the laser 706 can be configured as a single-mode laser that outputs the optical signal 708 as a Gaussian-shaped output beam to facilitate the modal filtering. As such, by providing the modal filtering via the optical fiber section 710 and/or the splicing point 711, noise and/or distortion associated with the optical signal 708 can be reduced. In one or more embodiments, an optical path of the optical signal 708 can include a mirror 712 to facilitate transmission of the optical signal 708 via the optical fiber 704. For example, the mirror 712 can be an optical path component (e.g., a reflective surface) that redirects and/or guides the optical signal 708 emitted from the laser 706 to the optical fiber section 710 and/or the optical fiber 704.

FIG. 8 illustrates a system 800 that facilitates embedded modal filtering for a photodiode according to one or more embodiments of the present disclosure. For instance, in one or more embodiments, the system 800 provides a photodiode transceiver device (e.g., a photodiode optical transceiver) with embedded modal filtering. The system 800 includes a network interface module 702'. The network interface module 702' can be, for example, a transceiver device (e.g., an optical transceiver) that facilitates fiber optic communication. In one or more embodiments, the network interface module 702' can be a pluggable optical transceiver with a set of pins to facilitate connection with an optical fiber 804. The optical fiber 804 can be, for example, a fiber optic communication channel (e.g., a transparent fiber optic connection, a fiber optic wire, etc.) that transmits pulses of infrared light. In an embodiment, the network interface module 702' is an alternate embodiment of the network interface module 702.

In an embodiment, the optical fiber 804 includes a single optical communication channel (e.g., a single fiber optic wire). In another embodiment, the optical fiber 804 includes two or more optical communication channels (e.g., two or more fiber optic wires). In another embodiment, the optical fiber 804 can include, additionally or alternatively, a fiber bundle. However, it is to be appreciated that, in certain embodiments, the optical fiber 804 can be implemented in a different manner to facilitate fiber optic communications via the optical fiber 804. In an embodiment, the optical fiber 804 can be a single mode optical fiber cable (e.g., a SMF28e® fiber optic cable). In another embodiment, the optical fiber 804 can be a multimode optical fiber cable (e.g., an OM3 fiber optic cable, an OM4 fiber optic cable, or an OM5 fiber optic cable). However, it is to be appreciated that, in certain embodiments, the optical fiber 804 can be implemented as a different type of optical fiber.

In an embodiment, the network interface module 702' includes a photodiode 802. The photodiode 802 can be, for example, an optical transceiver photodiode. In one or more embodiments, the photodiode 802 can be configured to receive an optical signal 808. The optical signal 808 can be, for example, an optical signal associated with data transmitted via the optical fiber 804. For example, in one or more embodiments, the optical signal 808 can be an electromagnetic signal that transmits data at 10G, 25G, 40G, 50G, 100G, 200G, 400G or another data speed via the optical fiber 804. In one or more embodiments, the photodiode 802 can receive the optical signal 108 at a particular wavelength (e.g., 1060 nm or another wavelength). In an embodiment, the photodiode 802 can be attached to a substrate such as, for example, a printed circuit board of the network interface module 702'. In certain embodiments, the network interface module 702' can additionally include the laser 706 to provide a laser/photodiode transceiver device (e.g., a laser/photodiode optical transceiver) with embedded modal filtering. Alternatively, in certain embodiments, the network interface module 702 can additionally include the photodiode 802 to provide a laser/photodiode transceiver device (e.g., a laser/photodiode optical transceiver) with embedded modal filtering.

In an embodiment, the photodiode 802 is a semiconductor device configured to receive energy particles and/or photons of the optical signal 108. In one or more embodiments, the photodiode 802 is a P-N junction diode that comprises at least a substrate (e.g., an N-type substrate), a buffer layer (e.g., an N-type buffer layer), an absorption layer (e.g., an N-type absorption layer) and/or a P layer.

An optical path of the optical signal 808 received by the photodiode 802 can include an optical fiber section 810 and/or a splicing point 811. For instance, the splicing point 811 and the optical fiber section 810 can be configured to receive the optical signal 808 transmitted via the optical fiber 804. The optical fiber section 810 can be configured to be connected to the optical fiber 804 via the splicing point 811 such that, in operation, the optical signal 808 is transmitted from the optical fiber 804 to the photodiode 802 via the splicing point 811 and the optical fiber section 810. In an aspect, the optical fiber section 810 can interface to the optical fiber 804 through the splicing point 811. For instance, the optical fiber 804 can facilitate transmission of single model light associated with the optical signal 808 and can provide the optical signal 808 to the optical fiber section 810 via the splicing point 811. In certain embodiments, the splicing point 811 can be a connector that connects the optical fiber section 810 and the optical fiber 804. In certain embodiments, the splicing point 811 provide a fusion-splice between the optical fiber section 810 and the optical fiber 804. In one or more embodiments, the splicing point 811 can be configured such that only the fundamental mode for the optical signal 808 is excited in the optical fiber section 810. For example, in one or more embodiments, the splicing point 811 can be configured such that optical power is coupled to the LP01 mode within the optical fiber section 810. In a non-limiting example, the optical fiber section 810 can be a single-mode optical fiber at 1060 nm. In certain embodiments, the optical fiber section 810 and the splicing point 811 can be implemented as a fiber optic pigtail where the optical fiber section 810 is an optical fiber that is terminated by the splicing point 811 configured as a connector. In certain embodiments, the optical fiber section 810 and/or the splicing point 811 can correspond to an optical coupling element configured to receive the optical signal 808 transmitted via the optical fiber 804. In certain embodiments, the optical coupling element associated with the optical fiber section 810 and/or the splicing point 811 can be configured to be connected to the optical fiber 804 such that, in operation, the optical signal 808 is transmitted from the optical fiber 804 to the photodiode 802 via the optical coupling element. In certain embodiments, the optical coupling element associated with the optical fiber section 810 and/or the splicing point 811 can interface a first optical fiber section associated with a first core diameter and a second optical fiber section associated with a second core diameter. For example, in certain embodiments, the optical fiber section 810 can be the first optical fiber section associated with the first core diameter and the optical fiber 804 can be the second optical fiber section associated with the second core diameter. In certain embodiments, the optical coupling element associated with the optical fiber section 810 and/or the splicing point 811 can provide modal filtering of the optical signal 808. In certain embodiments, the optical coupling element associated with the optical fiber section 810 and/or the splicing point 811 interfaces the first optical fiber section and the second optical fiber section via fusion-splicing associated with the splicing point 811 to provide the modal filtering of the optical signal 808. In one or more embodiments, an optical path of the optical signal 808 can include a mirror 812 to facilitate transmission of the optical signal 808 via the optical fiber 804. For example, the mirror 812 can be an optical path component (e.g., a reflective surface) that redirects and/or guides the optical signal 808 from the optical fiber section 810 and to the photodiode 802.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution.

For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

FIG. 9 is a flowchart illustrating an example method that provides embedded modal filtering for a laser in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 9 may, for example, be performed by an example computing system 1100 (shown in FIG. 11) that is embedded in a network interface module (e.g., the network interface module 102), a laser (e.g., the laser 106), and/or a NIC (e.g., the NIC 502). In some embodiments, the computing system 1100 is a firmware computing system embedded in a network interface module (e.g., the network interface module 102), a laser (e.g., the laser 106), and/or a NIC (e.g., the NIC 502). In one or more embodiments, one or more of the operations illustrated in FIG. 9 may, for example, be performed by a network interface module (e.g., the network interface module 102), a laser (e.g., the laser 106), and/or a NIC (e.g., the NIC 502). In one or more embodiments, at operation 902, the computing system 1100 receives an electrical signal associated with communication data. In one or more embodiments, at operation 904, the computing system 1100 configures, based on the electrical signal, emission of an optical signal by a laser that is optically coupled to an optical coupling element that comprises a tapered section for providing modal filtering of the optical signal.

FIG. 10 is a flowchart illustrating an example method that provides embedded modal filtering for a photodiode in accordance with one or more embodiments of the present disclosure. It will be understood that each block of the flowcharts, and combinations of blocks in the flowcharts, may be implemented by various means. In some example embodiments, certain ones of the operations herein may be modified or further amplified as described below. Moreover, in some embodiments additional optional operations may also be included. It should be appreciated that each of the modifications, optional additions, or amplifications described herein may be included with the operations herein either alone or in combination with any others among the features described herein. The operations illustrated in FIG. 10 may, for example, be performed by an example computing system 1100 (shown in FIG. 11) that is embedded in a network interface module (e.g., the network interface module 102'), a photodiode (e.g., the photodiode 202), and/or a NIC (e.g., the NIC 502). In some embodiments, the computing system 900 is a firmware computing system embedded in a network interface module (e.g., the network interface module 102'), a photodiode (e.g., the photodiode 202), and/or a NIC (e.g., the NIC 502). In one or more embodiments, one or more of the operations illustrated in FIG. 9 may, for example, be performed by a network interface module (e.g., the network interface module 102'), a photodiode (e.g., the photodiode 202), and/or a NIC (e.g., the NIC 502). In one or more embodiments, at operation 1002, the computing system 1100 receives an optical signal associated with communication data via a photodiode optically coupled to an optical coupling element that comprises a tapered section for providing modal filtering of the optical signal. In one or more embodiments, at operation 1004, the computing system 1100 translates the optical signal into an electrical signal.

FIG. 11 illustrates the computing system 1100 that may be embedded in a datacenter network system. In some cases, the computing system 1100 may be a firmware computing system communicatively coupled with, and configured to control, one or more circuit modules associated with a network interface module (e.g., a transceiver module). For example, the computing system 1100 may be a firmware computing system and/or a controller computing system communicatively coupled with one or more circuit modules, such as a network interface module (e.g., the network interface module 102 and/or 102'), a laser (e.g., the laser 106), and/or a NIC (e.g., the NIC 502). The computing system 1100 may include or otherwise be in communication with a processor 1110, a memory circuitry 1120, and communication circuitry 1130. In some embodiments, the processor 1110 (which may include multiple or co-processors or any other processing circuitry associated with the processor) may be in communication with the memory circuitry 1120. The memory circuitry 1120 may comprise non-transitory memory circuitry and may include one or more volatile and/or non-volatile memories. In some examples, the memory circuitry 1120 may be an electronic storage device (e.g., a computer readable storage medium) configured to store data that may be retrievable by the processor 1110. In some examples, the data stored in the memory 1120 may include communication protocol data, or the like for enabling the apparatus to carry out various functions or methods in accordance with embodiments of the present invention, described herein.

In some examples, the processor 1110 may be embodied in a number of different ways. For example, the processor may be embodied as one or more of various hardware processing means such as a microprocessor, a coprocessor, a digital signal processor (DSP), a controller, or a processing element with or without an accompanying DSP. The processor 1110 may also be embodied in various other processing circuitry including integrated circuits such as, for example, an FPGA (field programmable gate array), a microcontroller unit (MCU), an ASIC (application specific integrated circuit), a hardware accelerator, or a special-purpose electronic chip. Furthermore, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining, and/or multithreading. In some embodiments, the processor 1110 is a microprocessor.

In an example embodiment, the processor 1110 may be configured to execute instructions, such as computer program code or instructions, stored in the memory circuitry 1120 or otherwise accessible to the processor 1110. Alternatively or additionally, the processor 1110 may be configured to execute hard-coded functionality. As such, whether configured by hardware or software instructions, or by a combination thereof, the processor 1110 may represent a computing entity (e.g., physically embodied in circuitry) configured to perform operations according to an embodiment of the present invention described herein. For example, when the processor 1110 is embodied as an ASIC, FPGA, or similar, the processor may be configured as hardware for conducting the operations of an embodiment of the invention. Alternatively, when the processor 1110 is embodied to execute software or computer program instructions, the instructions may specifically configure the processor 1110 to perform the algorithms and/or operations described herein when the instructions are executed. However, in some cases, the processor 1110 may be a processor of a device (e.g., a mobile terminal or a fixed computing device) specifically configured to employ an embodiment of the present invention by further configuration of the processor using instructions for performing the algorithms and/or operations described herein. The processor 1110 may further include a clock, an arithmetic logic unit (ALU) and logic gates configured to support operation of the processor 1110, among other things.

The computing system 1100 may optionally also include the communication circuitry 1130. The communication circuitry may be any means embodied in either hardware or a combination of hardware and software that is configured to receive and/or transmit data from/to a network and/or any other device or module in communication with the computing system 1100. In this regard, the communication interface may include, for example, supporting hardware and/or software for enabling communications. As such, for example, the communication circuitry 1130 may include a communication modem and/or other hardware/software for supporting communication via cable, universal serial bus (USB), integrated circuit receiver, or other mechanisms.

Many modifications and other embodiments of the present inventions set forth herein will come to mind to one skilled in the art to which these inventions pertain having the benefit of the teachings presented in the foregoing descriptions and the associated drawings. Therefore, it is to be understood that the present inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A system comprising:
    a laser configured to emit an optical signal; and
    an optical coupling element configured to receive the optical signal emitted by the laser,
    wherein the optical coupling element is configured to be connected to an optical fiber such that, in operation, the optical signal is transmitted from the laser to the optical fiber via the optical coupling element, and
    wherein the optical coupling element comprises a tapered section defining:
        a first core section;
        a second core section; and
        a third core section,
    wherein the optical coupling element provides modal filtering of the optical signal,
    wherein the second core section is defined between the first core section and the third core section, and the second core section defines a constant cross-sectional shape extending over a length,
    wherein the optical coupling element is attached to a mechanical structure via an adhesive material having a refractive index configured for the modal filtering.

2. The system of claim 1, wherein the tapered section is formed of an optical fiber.

3. The system of claim 2, wherein the first core section, the second core section, and the third core section each comprise a portion of a core of the optical fiber forming the tapered section.

4. The system of claim 1, wherein the tapered section is formed of a waveguide.

5. The system of claim 1, wherein the first core section is associated with a first core diameter, the second core section is associated with a second constant core diameter extending over the length, and the third core section is associated with the first core diameter.

6. The system of claim 1, further comprising:
    a mirror disposed between the laser and the optical coupling element, wherein the mirror directs the optical signal from the laser to the optical coupling element.

7. The system of claim 1, wherein an optical transceiver comprises the laser.

8. A system comprising:
    a photodiode configured to receive an optical signal transmitted via an optical fiber; and
    an optical coupling element configured to be connected to the optical fiber such that, in operation, the optical signal is transmitted from the optical fiber to the photodiode via the optical coupling element,
    wherein the optical coupling element comprises a tapered section defining:
        a first core section;
        a second core section; and
        a third core section,
    wherein the optical coupling element provides modal filtering of the optical signal,
    wherein the second core section is defined between the first core section and the third core section, and the second core section defines a constant cross-sectional shape extending over a length,
    wherein the optical coupling element is attached to a mechanical structure via an adhesive material having a refractive index configured for the modal filtering.

9. The system of claim 8, wherein the tapered section is formed of an optical fiber.

10. The system of claim 9, wherein the first core section, the second core section, and the third core section each comprise a portion of a core of the optical fiber forming the tapered section.

11. The system of claim 8, wherein the tapered section is formed of a waveguide.

12. The system of claim 8, wherein the first core section is associated with a first core diameter, the second core section is associated with a second constant core diameter extending over the length, and the third core section is associated with the first core diameter.

13. A system comprising:
a laser configured to emit an optical signal; and
an optical coupling element configured to receive the optical signal emitted by the laser,
wherein the optical coupling element is configured to be connected to an optical fiber such that, in operation, the optical signal is transmitted from the laser to the optical fiber via the optical coupling element,
wherein the optical coupling element interfaces a first optical fiber section associated with a first core diameter and a second optical fiber section associated with a second core diameter, and
wherein the optical coupling element provides modal filtering of the optical signal,
wherein the optical coupling element defines:
a first core section;
a second core section; and
a third core section,
wherein the second core section is defined between the first core section and the third core section, and the second core section defines a constant cross-sectional shape extending over a length,
wherein the optical coupling element is attached to a mechanical structure via an adhesive material having a refractive index configured for the modal filtering.

14. The system of claim 13, wherein the optical coupling element interfaces the first optical fiber section and the second optical fiber section via a tapered section to provide the modal filtering of the optical signal.

15. The system of claim 13, wherein the optical coupling element interfaces the first optical fiber section and the second optical fiber section via fusion-splicing to provide the modal filtering of the optical signal.

16. The system of claim 5, wherein the first core diameter is greater than the second constant core diameter.

17. The system of claim 5, wherein the first core section tapers from the first core diameter to the second constant core diameter.

18. The system of claim 5, wherein the third core section tapers from the second constant core diameter to the first core diameter.

19. The system of claim 12, wherein the first core diameter is greater than the second constant core diameter.

20. The system of claim 12, wherein the first core section tapers from the first core diameter to the second constant core diameter.

21. The system of claim 12, wherein the third core section tapers from the second constant core diameter to the first core diameter.

* * * * *